June 24, 1924.　　　　　S. E. ALLEY ET AL　　　　　1,498,604
COMBINED ENGINE CRANK SHAFT AND DIFFERENTIAL DRIVING GEARING
Filed Aug. 13, 1923
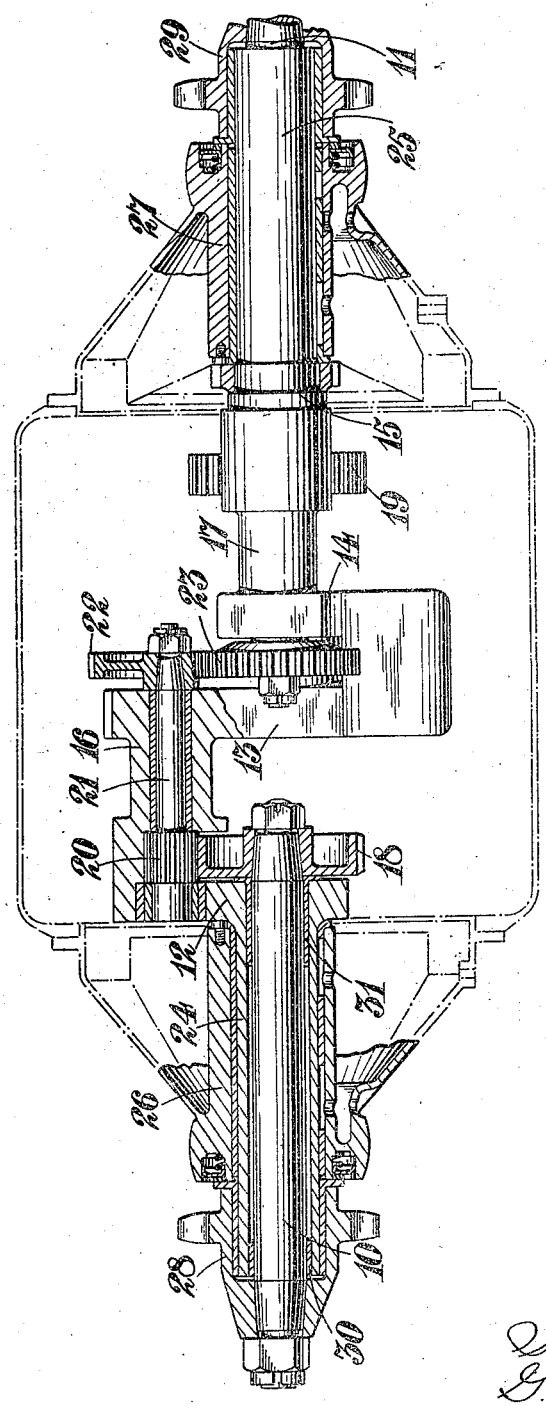
Inventors
S. E. Alley
G. Goodvine
By
Victor, Colt, Morse & Grindle
Attorneys Patented June 24, 1924.

1,498,604

UNITED STATES PATENT OFFICE.

STEPHEN EVANS ALLEY, OF LONDON, AND GEORGE WOODVINE, OF SHREWSBURY, ENGLAND, ASSIGNORS TO THE "SENTINEL" WAGGON WORKS (1920) LIMITED, OF LONDON, ENGLAND, A BRITISH COMPANY.

COMBINED ENGINE CRANK SHAFT AND DIFFERENTIAL DRIVING GEARING.

Application filed August 13, 1923. Serial No. 657,214.

*To all whom it may concern:*

Be it known that we, STEPHEN EVANS ALLEY, a subject of the King of England, residing at London, England, and GEORGE WOODVINE, a subject of the King of England, residing in Shrewsbury, Shropshire, England, have invented certain new and useful Improvements in Combined Engine Crank Shafts and Differential Driving Gearing, of which the following is a specification.

This invention relates to combined engine-crank-shaft and differential driving gearing, and has for one of its objects to provide more satisfactory bearings for the crank shaft and gearing than have heretofore been proposed.

The invention provides improvements on combined engine-crank-shaft and differential driving gearing of the type whereof the combined crank shaft and differential gearing disclosed in the U. S. Patent No. 1,381,781 is one example.

The primary feature of the present invention consists in an improvement upon a combined engine-crank-shaft and differential gearing of the type referred to, which improvement is characterized in that at each end of the crank shaft and gearing the sleeve, fixed with the crank web, extends therefrom to a point which, for a purpose now to be indicated, is at least at or substantially at the outer end of the portion of the casing of the gearing which is concentric with said sleeve and forms the bearing for it from adjacent the crank web up to said point. The purpose of this construction is to elongate the sleeve and utilize solely as the bearing of the elongated sleeve the whole available length of that part of the casing of the gearing which is concentric with the sleeve and which heretofore has been utilized as to part of that length for the support of the aforesaid end shaft which exerts a wearing effect upon that part of the length different from the wearing effect of the sleeve upon the rest of the length. It will be appreciated that whenever differential action occurs the sleeve and end shaft will move relatively to each other, and in the constructions heretofore known wherein these parts have been housed in two different portions of a plain straight bearing this relative movement has been liable to cause unequal wear along the length of the bearing which is, of course, objectionable. In the construction according to the present invention the sleeve on the crank web reaches along the full length of the bearing surface provided by the end of the casing of the gearing, and the end shaft itself does not rub against this bearing.

Another object of the invention is to provide that thus, the wear of the end shaft and its bearing in the interior of the sleeve shall be equalized along the length of both of these parts.

It is a further feature of the invention to prolong the sleeve beyond the end of the casing of the gearing so that it may be enveloped by, and form the bearing for, a hollow transmission member (such as a sprocket wheel) fixed to the respective end shaft. This construction provides that the wear between the sprocket wheel and its supporting parts, in relation to the crank-shaft, is only that due to differential action between them, and this being relatively small, alignment is preserved for a much longer period than would otherwise be the case.

For a more complete understanding of the invention there will now be described, by way of example only and with reference to the accompanying drawings, one constructional form of combined engine-crank-shaft and differential driving gearing according to the present invention. It is to be understood, however, that the invention is not limited to the precise constructional details set forth.

In the drawings the single figure is a view partly in section showing the invention applied to a construction of combined crank-shaft and differential gearing somewhat similar to that shown in the United States Patent No. 1,381,781 aforesaid. In the drawings the casing of the gearing is shown partly in chain lines.

The mechanism comprises aligned end shafts 10 and 11 whereof the axis is the crank shaft axis. The crank webs are shown at 12, 13, 14 and 15 and the crank pins at 16 and 17. The shafts 10 and 11 carry at the inner faces of the webs 12 and 15 gear wheels 18 and 19 which mesh with corresponding wheels such as 20 carried on shafts such as 21 co-axial with the crank pins 16 and 17. The wheels 20 are rotatable bodily with the crank pins about the crank shaft axis. The shafts 21 also carry other wheels 22, 23 which mesh with each other and constitute part of the differential gearing.

On the outer faces of the webs 12 and 15 are sleeves 24 and 25 which are fixed with their respective webs. In the construction illustrated they are formed integral therewith, but this is not essential. The sleeves 24 and 25, which it will be seen are very much more elongated than are the corresponding sleeves E and F shown in U. S. Patent No. 1,381,781 aforesaid constitute, in the construction illustrated, the sole bearings for the end shafts 10 and 11 which are of one and the same diameter throughout their length. Bushes 30 and 31 are shown at the ends of the sleeve 24. The bush 30 is not essential as other provision is made, as will be hereinafter indicated, for supporting the outer ends of the shafts 10 and 11, but the inclusion of this bush is from some points of view desirable since it will be found to be of assistance in assembling and aligning the parts. The bushes 30 and 31 may be replaced by a single continuous bush if desired. Furthermore, instead of the interior of the sleeves 24, 25 affording a continuous bearing surface they could be recessed at points say towards the middle of their length leaving the remaining portions only to form the bearing surface.

The sleeves 24 and 25 are themselves supported in bearings constituted by portions 26 and 27 of the gear casing indicated in chain lines. The sleeves extend at least to points at or substantially at the outer ends of the bearings 26 and 27 and thus the wear in the latter will be constant along their length. Actually, of course, in the construction shown the sleeves are prolonged beyond the ends of the bearings 26 and 27 and are enveloped by, and form the bearings for, hollow sprocket wheels 28 and 29 fixed to the end shafts 10 and 11 respectively. These sprocket wheels may be regarded as affording the principal support for the outer ends of the shafts 10 and 11, and it consequently will not be of importance if the bushes 30 become worn or are omited.

From the foregoing it will be seen that adequate bearing support is provided for the crank-shaft as an entity and also for the end shafts of the differential gearing and that moreover the arrangements are such that the wear in individual bearings is equalized as far as possible and that the whole crank-shaft is a strong unit not liable to unequal wear and consequential loss of alignment after long periods of use. Mechanism constructed according to the present invention, therefore, will be found to be more satisfactory in use than constructions heretofore known of the type referred to above.

What we claim as our invention and desire to secure by Letters Patent is:

1. A combined engine crank-shaft and differential gearing, comprising in combination a hollow shaft in the form of a sleeve having a crank-web and a crank-pin on the latter, an end shaft mounted coaxially in said sleeve and extending to the inner face of the crank-web, a gear-wheel fast on said end shaft at the inner face of the crank-web, a second wheel coaxial with said crank-pin, and meshing with said gear-wheel, and mounted so as to be rotatable bodily with the crank-pin about the axis of rotation of said sleeve, and a long bearing for said sleeve, which bearing is concentric with the sleeve and has its inner end situated adjacent to the said web, said sleeve extending to the outer end of said bearing.

2. A combined engine crank-shaft and differential gearing, comprising in combination a hollow shaft in the form of a sleeve having a crank-web and a crank-pin on the latter, an end shaft mounted coaxially in said sleeve and extending to the inner face of the crank-web, a gear-wheel fast on said end shaft at the inner face of the crank-web, a second wheel coaxial with said crank-pin, and meshing with said gear-wheel, and mounted so as to be rotatable bodily with the crank-pin about the axis of rotation of said sleeve, and a casing for the aforesaid parts, whereof a portion constitutes a bearing for said sleeve, which sleeve extends along the full length of the bearing surface provided for it by the said bearing which is concentric with it from adjacent the said web to a point remote therefrom.

3. A combined engine crank-shaft and differential gearing, comprising in combination a hollow shaft in the form of a sleeve having a crank-web and a crank-pin on the latter, an end shaft mounted coaxially in said sleeve and extending to the inner face of the crank-web, bearing bushes for the end shaft within said sleeve towards the ends of the latter, which bearing bushes are of one and the same diameter throughout their collective lengths, a gear-wheel fast on said end shaft at the inner face of the crank-web, a second wheel coaxial with said crank-pin and meshing with said gear-wheel, and mounted so as to be rotatable bodily with the crank-pin about the axis of rotation of said sleeve, and a long bearing for said sleeve, which bearing is concentric with the sleeve and has its inner end situated adjacent to the said web, said sleeve extending to the outer end of said bearing.

4. A combined engine crank-shaft and differential gearing, comprising in combination a hollow crank-shaft in the form of a sleeve having a crank-web and a crank-pin on the latter, an end shaft mounted coaxially in said sleeve and extending to the inner face of the crank-web, a gear-wheel fast on said end shaft at the inner face of the crank-web, a second wheel coaxial with said crank-pin, and meshing with said gear-wheel, and mounted so as to be rotatable bodily with the crank-pin about the axis of rotation of said sleeve, a long bearing for said sleeve, which bearing is concentric with the sleeve and has its inner end situated adjacent to the said web, said sleeve extending to the outer end of said bearing, and a hollow transmission member mounted upon the said end shaft and enveloping the outer end of the said sleeve which extends beyond the outer end of the said bearing, which outer end of the sleeve forms a bearing for said hollow transmission member.

In testimony whereof we have signed our names to this specification.

STEPHEN EVANS ALLEY.
GEORGE WOODVINE.